(12) United States Patent
Dunlop et al.

(10) Patent No.: US 9,101,119 B2
(45) Date of Patent: Aug. 11, 2015

(54) BOWFISHING REEL

(75) Inventors: Thomas L. Dunlop, Lake City, MI (US);
David W. White, Smithfield, UT (US)

(73) Assignee: The Bohning Company, LTD, Lake City, MI (US)

( * ) Notice: Subject to any disclaimer, the term of this patent is extended or adjusted under 35 U.S.C. 154(b) by 896 days.

(21) Appl. No.: 13/107,788

(22) Filed: May 13, 2011

(65) Prior Publication Data

US 2012/0285430 A1 Nov. 15, 2012

(51) Int. Cl.
*F41B 5/00* (2006.01)
*A01K 89/00* (2006.01)
*A01K 91/02* (2006.01)
*A01K 89/01* (2006.01)
*A01K 89/08* (2006.01)
*F41B 5/14* (2006.01)

(52) U.S. Cl.
CPC ............ *A01K 89/0108* (2013.01); *A01K 89/08* (2013.01); *F41B 5/1488* (2013.01)

(58) Field of Classification Search
CPC ....... F41B 5/1488; A01K 91/02; A01K 89/00
USPC ........ 124/1, 23.1, 86, 88; 43/19, 22; 242/224, 242/228, 231, 232, 233
See application file for complete search history.

(56) References Cited

U.S. PATENT DOCUMENTS

| 3,142,127 | A | * | 7/1964 | Mason | 43/19 |
|---|---|---|---|---|---|
| 3,342,442 | A | * | 9/1967 | Brantingson | 242/233 |
| 3,377,999 | A | * | 4/1968 | Bennett | 124/88 |
| 3,411,230 | A | * | 11/1968 | Hopper | 242/225 |
| 3,522,916 | A | * | 8/1970 | Saunders | 242/387 |
| 3,743,207 | A | * | 7/1973 | McMickle | 242/233 |
| 3,872,853 | A | * | 3/1975 | Nakatani | 124/22 |
| 3,949,730 | A | * | 4/1976 | Schoenberger | 124/23.1 |
| 4,024,667 | A | * | 5/1977 | Wegener | 43/19 |
| 4,147,313 | A | * | 4/1979 | Sazaki | 242/232 |
| 4,383,516 | A | * | 5/1983 | La See | 124/88 |
| 4,501,085 | A | * | 2/1985 | Barnes | 43/19 |
| 4,674,471 | A | * | 6/1987 | Lance | 124/86 |
| 4,726,348 | A | * | 2/1988 | Saunders | 124/23.1 |
| 4,744,347 | A | * | 5/1988 | Dodge | 124/86 |
| 4,773,179 | A | * | 9/1988 | Corley | 43/19 |
| 4,845,880 | A | * | 7/1989 | Miller | 43/19 |
| 5,143,044 | A | * | 9/1992 | Bourquin | 124/88 |
| 5,154,369 | A | * | 10/1992 | Smith | 242/233 |
| 5,342,003 | A | * | 8/1994 | Sugawara et al. | 242/231 |
| 5,443,218 | A | * | 8/1995 | Ciocca | 242/256 |
| 5,467,932 | A | * | 11/1995 | Puryear | 242/236 |
| 5,595,166 | A | * | 1/1997 | Schmidt et al. | 124/22 |
| 5,609,147 | A | * | 3/1997 | Withorn, Jr. | 124/86 |
| 5,620,149 | A | * | 4/1997 | Zurcher et al. | 242/233 |
| 5,662,283 | A | * | 9/1997 | Puryear et al. | 242/233 |
| 5,667,159 | A | * | 9/1997 | Carpenter et al. | 242/233 |
| 5,735,074 | A | * | 4/1998 | Stauffer | 43/19 |
| 5,988,546 | A | * | 11/1999 | Young | 242/232 |
| 6,056,220 | A | * | 5/2000 | Cockerham et al. | 242/233 |
| 6,382,542 | B1 | * | 5/2002 | Sato | 242/243 |

(Continued)

*Primary Examiner* — Melba Bumgarner
*Assistant Examiner* — Alexander Niconovich
(74) *Attorney, Agent, or Firm* — Smith Risley Tempel Santos LLC; Gregory Scott Smith (57) ABSTRACT

A bowfishing reel that is biased into an open position in which the line is free to be fed from the reel. When desired, the user can actuate a mechanism that forces the bail into the closed position while the mechanism is engaged. Once the mechanism is released, the bail returns to the open position.

26 Claims, 5 Drawing Sheets

(56) References Cited

U.S. PATENT DOCUMENTS

| | | | |
|---|---|---|---|
| 6,517,453 B2 * | 2/2003 | LaSee | 473/578 |
| 6,634,350 B2 * | 10/2003 | LaSee | 124/86 |
| 6,651,916 B2 * | 11/2003 | Takikura et al. | 242/231 |
| 6,843,439 B1 * | 1/2005 | Grice et al. | 242/247 |
| 7,178,751 B1 * | 2/2007 | Isaacs | 242/231 |
| 7,607,602 B2 * | 10/2009 | Hiraoka et al. | 242/232 |
| 8,096,493 B2 * | 1/2012 | Bennis | 242/231 |
| 8,464,700 B2 * | 6/2013 | Smith et al. | 124/87 |
| 2003/0116666 A1 * | 6/2003 | Takikura et al. | 242/232 |
| 2003/0140912 A1 * | 7/2003 | LaSee | 124/86 |
| 2005/0017112 A1 * | 1/2005 | Grice et al. | 242/247 |
| 2005/0087180 A1 * | 4/2005 | Hayes | 124/1 |
| 2009/0038600 A1 * | 2/2009 | Robinik | 124/22 |
| 2012/0042863 A1 * | 2/2012 | Smith et al. | 124/87 |
| 2012/0292416 A1 * | 11/2012 | Bennis | 242/233 |

* cited by examiner

BOWFISHING REEL

BACKGROUND

Since the early days of man, there were gatherers, and then, there were the hunters. And although the origin of the hunter's adventures was one meant for survival, the innate character of mankind still thrived on the sport of the hunt. One of the earlier, and safer forms of the hunt, was fishing, also referred to as angling. Fishing has sporting roots as early as 2000 BC in which an ancient Egyptian angling scene depicts men with sticks and lines, as well as nets, seeking their prey. Today, angling as a sport is main-stream with fishing tournaments, sponsored anglers, fishing shows on primetime, and the like.

Another form of hunting that dates back to the Stone Age is bow hunting. The oldest arrow heads were discovered in Africa and were dated to be from before 25,000 BC. Scientists have theorized that the bow was created as an off-shoot of the spear-thrower. Somewhere around 25,000-18,000 BC, man began to use fire to further harden his stone arrowheads and added feathers to his arrows in order to improve accuracy. In approx. 2800 BC, the first composite bow was produced by the Egyptians. It was made from wood, tipped with animal horn and held together with animal sinew and glue. Unstrung, it resembled a "C" shape and would have required 2 people to string it. The bowstring was made from "catgut" (sheep intestines). The arrows used were extremely light, could be shot 400 yards using the composite bow and would easily penetrate the armor of that time period. The Egyptians used archers on the back of light chariots who were highly trained and skilled and could easily outflank an enemy army with devastating effect.

It shouldn't be all that surprising, that given the adventurous and inventive nature of mankind, that eventually these two sports would be combined. Today, the popular sport of bowfishing has a national organization called the Bowfishing Association of America, which was originally established in 1990 to keep track of bowfishing tournaments in the United States, and which now lobbies for the rights to bowfish and promote the sport.

Bowfishing is a method of fishing that uses specialized archery equipment to shoot and retrieve fish. Fish are shot with a barbed arrow that is attached with special line to a reel mounted on the bow. Some freshwater species commonly hunted include common carp, grass carp, bighead carp, alligator gar, and paddlefish. In saltwater, rays and sharks are regularly pursued. An even more recent variation in the sport is areal bowfishing in which the hunter shoots fish as the leap from the water.

Bowfishing equipment generally includes a bow, arrows, line, reels and glasses. Some of the bows used by bowfishermen a simple and do not include any sights—aiming is by line-of-sight judgment down the arrow. There are a couple of types of rests including the hook and roller rest. Most bows have little to no let off and not much draw weight. There are two main types of bows: traditional and recurve bows. The traditional bows are like long bows. In more modern times compound bows came into use. They use a system of pulleys to help the archer. Modern bows can have as much as 120 pounds (50 kg) draw weight. The crossbow is also sometimes used in the sport of bowfishing and has its own advantages including the use of a reel.

The arrows used in bowfishing are typically heavier and stronger than arrows used in other types of archery and are most commonly constructed of five-sixteenth inch fiberglass, but solid aluminum, carbon fiber, and carbon fiber reinforced fiberglass are also used. Bowfishing arrows generally lack fletching, as it can cause the arrow to flare to one side or another underwater and they are not required at the relatively short ranges associated with bowfishing. Line is attached to the arrow by tying to a hole in the arrow shaft or through the use of a slide system.

Bowfishing line is often made from braided nylon, Dacron, or Spectra. Commonly used line weights range from eighty to four-hundred pound test, with six-hundred being used when bowhunting for alligators. Line color is normally either lime-green, white, or neon orange.

Three types of reels are commonly used in bowfishing: Hand-wrap, spincast, and retriever. Hand-wrap reels are the simplest reels; they consist of a circular spool that line is wrapped onto by hand and then secured in a line holding slot. When the arrow is shot the line comes free from the line holder and feeds off the spool. Fish are fought by pulling the line in hand over hand; hand-wrap reels are the least effective at fighting arrowed fish, but they can be used in conjunction with a float system to shoot and fight large trophy fish. Retriever reels have a "bottle" which holds the line in place. When shot the line comes out either until the shot goes too far and the line runs out or the hunter pushes down a stopping device which can be used to keep a fish from traveling out too far. Some retriever reels have slots cut in them and are known as slotted retriever reels. They are more commonly used for alligator, alligator gar, shark and other big game that will take more time to chase down than smaller game fish.

The glasses or sight enable a good visual of the target. To see the fish in the water on a sunny day, polarized lenses are helpful. The polarized lenses cut the glare on top of the water so it makes it easier to see what is below the surface. Different tints and lens colors make a difference in the color of water the hunter is fishing in, from darker brown to clearer blue and green. At night glasses are unnecessary, as light is used to see through the water.

Recently, bowfishing gear has incorporated the use of spinning reels, or open-faced reels. Spinning reels include a fixed spool and reels come in a variety of sizes and gearing rations that can handle as little as 2-lb. test line up to 50-lb. test line. Spinning reels include handles for retrieving the line. The handles are threaded into sockets on either side of the reel's body. This allows the bowfisherman to swap sides for left- or right-handed operation. The angler rotates the handle to retrieve the line.

The reel includes a body, which is composed of a foot, a gear box housing and a support arm. The bodies are often made out of plastic, graphite or aluminum, with plastic being the most economical but not necessarily the most reliable. Of each of these materials, graphite is the lightest but aluminum is the strongest.

Inside the body is a gear box that is coupled to the handle and the spindle. The gear box is designed to amplify the number of spindle rotations for each rotation of the handle. A common gear ratio is three to one so that each rotation of the handle results in three rotations of the spindle.

Spools hold the fishing line and are typically made of anodized aluminum or graphite. The line is secured to the spool and is wrapped around its axis. The spool is rotated on the spindle by the gears when the line is retrieved and freely rotates during the cast.

Spinning reels typically include a drag system. The drag system refers to a set of washers that hold the spool to the shaft. An adjustment knob on the front of the spool is turned to increase or decrease the amount of friction, or drag, applied. By increasing the drag, more force is required to pull line from the reel when the line is being reeled onto the spool.

The bail is a semi-circular section of wire that is attached to the body on a hinged joint. The bail is flipped forward to release the line for casting. As the handle is rotated to retrieve the line, the bail is automatically flipped back to its starting position. Attached to the bail is a bracket wrap that moves with the spindle as it turns to ensure the line is evenly wrapped on the spool.

When engaged, the anti-reverse lever is designed to prevent the reel from rotating backward. When not engaged, the gear box can rotate in either direction.

Bow fishing most likely was not in the mind of primitive man as the arrows, which were hand-made were much too costly to risk losing in the water. Bow fishing is a method of catching fish that utilizes specialized archery equipment designed to not only shoot the fish without losing one's arrow, but also to allow for the retrieval of the fish. Fish are shot with a barbed arrow that is attached with a special line to a reel mounted on the bow or easily accessible to the archer.

The bows used in bow fishing are similar to the traditional bow but, traditionally have usually been very simple. Most of the bow fishing bows did not include sights and aiming was performed by line-of-sight judgment down the arrow. Most of the bows have little to no let off and not much draw weight. This differs with what one has available and personal preference. There are two main types of bows (a) traditional bows— long bows and (b) recurve bows. In more modern times, compound bows have been used. These compound bows use a system of pulleys to help the archer. Modern bows can have as much as 120 pounds (50 kg) draw weight.

The crossbow has also been used in bow fishing both from above the surface and below the surface of the water.

Bowfishing arrows are considerably heavier and stronger than arrows used in other types of archery and are most commonly constructed of five-sixteenth inch fiberglass, but solid aluminum, carbon fiber, and carbon fiber reinforced fiberglass are also used. Bowfishing arrows generally lack fletching, as it can cause the arrow to flare to one side or another underwater and they are not required at the relatively short ranges associated with bowfishing, but some archers still use fletching. Line is attached to the arrow by tying to a hole in the arrow shaft or through the use of a slide system.

The line used in bowfishing line is often made from braided nylon, Dacron, or Spectra. Commonly used line weights range from eighty to four-hundred pound test, with six-hundred being used when bowhunting for alligators. Line color is normally a bright color, such as neon orange, lime green and sometimes even white.

Three types of reels are commonly used in bowfishing: Hand-wrap, spincast, and retriever. Hand-wrap reels are the simplest reels consisting of a circular spool that line is wrapped onto by hand and then secured in a line holding slot. When the arrow is shot, the line comes free from the line holder and feeds off the spool. Hit fish are fought and retrieved by pulling the line in hand over hand. Hand-wrap reels are the least effective at fighting arrowed fish, but they can be used in conjunction with a float system to shoot and fight fish. Retriever reels have a "bottle" which holds the line in place. When shot the line comes out either until the shot goes too far and the line runs out or the hunter pushes down a stopping device which can be used to keep a fish from traveling too far. Some retriever reels have slots cut in them and are known as slotted retriever reels. They are more commonly used for alligator, alligator gar, shark and other big game fish that will take more time to chase down than smaller game fish.

An important aspect to bowfishing is having a good visual of the target. To see the fish in the water on a sunny day, polarized sun glasses are helpful. The polarized lens can cut the glare on top of the water to make it easier to see below the surface. Different tints and lens colors are used depending on the color of water the hunter is fishing in, from darker brown to clearer blue and green. At night glasses are unnecessary, as light is used to see through the water.

Most states allow bowfishing of the so-called "rough" fish. Those are suckers, eels, perch, gars, carp and the like. Gars and carp are the most popular and usually the most plentiful. Carp can be found in almost any body of water, large or small, year round. The best times are during the spawn in spring or after some good rainfall when the water in the shallows is deeper. The only things needed are bow, arrows, and waders. At times the fish can be so involved in spawning, the bowman can walk out among them and shoot. Some bowfishermen use field arrows so that they can just flip the fish onto shore without having to disengage the barbs to get the arrows out.

As the sport of bowfishing continues to grow in popularity, the bowfisherman naturally seeks inventive mechanisms and techniques to improve on the sport, increase the bowfisherman's productivity, and decrease the laborious aspects of the sport. The present disclosure is focused on such an inventive improvement.

BRIEF SUMMARY

The present disclosure presents various embodiments, as well as features and aspects thereof, of a bowfishing reel that enables the bail to remain in an open or unlocked position until a lever is actuated by the user. More specifically, in one embodiment of the bowfishing reel, the bail is spring loaded to bias the bail in the open position. However, a plunger that interacts with a bail lock can be actuated by moving a lever to the lock position. The bowfishing reel can be mounted near the hand grip of the bow, thereby allowing the bowfisherman to easily actuate the lever.

More specifically, one embodiment of the bowfishing reel includes a bail that is coupled to a spring mechanism to bias the bail into an opened position. Another mechanism is then used to cause the bail to move to a closed position when the mechanism is actuated. For instance, if the mechanism is a lever, pulling back on the lever may cause the bail to move to a closed position. Further, when the actuation of the mechanism is released, the spring mechanism causes the bail to return to the open position. In addition, an embodiment employing the lever may include a plunger that interfaces to the bail and the lever such that when the lever is actuated, the plunger forces the bail into the closed position. The plunger can take on a variety of forms and in one particular embodiment, includes a plunger guide and one or more actuating rods. The actuating rods interface to the bail and the plunger guide allows the plunger to slide from a first position to a second position. When the plunger is in the first position, the bail is open and when the plunger is in the second position, the bail is closed. In addition, embodiments may include an actuator that interfaces to the bail in such a way that when the bail actuator rotates in a first direction or moves to a first position, the bail moves from an open position to a closed position. When the bail actuator rotates in a second direction or to a second position, the bail moves from a closed position to an open position. In operating such an embodiment, the actuating rods force the bail actuator to rotate in the first direction when the plunger slides from the first position to the second position.

Embodiments of the bowfishing reel may also be described as a normally open-bail reel. The reel includes a bail that is coupled to a spring mechanism to bias the bail into an open position and a spool that holds a portion of fishing line. In cooperation with the bail, fishing line can be wound onto the spool. A locking mechanism is used to force the bail from the open position to the closed position. The locking mechanism includes a bail actuator that interfaces with the bail, a lever, a plunger, and a plunger guide. When the lever is at rest, or is not being forced into an actuated position, the bail remains in the open position. When the lever is actuated, the lever engages the plunger which then engages the bail actuator forcing the bail into a closed position. The spool mechanism in such reels, as well as in other embodiments may be a spinning reel or a fixed reel. For fixed reels, when a crank is turned, the bail is forced to rotate around the spool and the spool oscillates back and forth such that when the bail is in the closed position, the crank can be turned to rewind fishing line onto the spool. However, in the spinning spool embodiments, when the crank is turned, it forces the spool to spin and to oscillate such that when the bail is in the closed position, the crank can be turned to rewind fishing line onto the spool.

In the various embodiments, the lever may include a handle portion and one or more actuation fingers. The lever may be pivotally mounted such that when the handle is pulled in a first direction, the lever rotates around a pivot causing the actuator fingers to move in an opposing direction and engage with the plunger. However, in other embodiments, rather than a lever, the user may have a access to an actuator that is integral to or that slidably interfaces with the plunger. In such embodiments, rather than pulling on the handle, the user simply pushes the actuator to cause the plunger to move forward. In either embodiment, once the lever or actuator are released, the plunger is forced back by the springing mechanism thereby causing the bail to move back to the open position.

In the various embodiments, the bowfishing reel may be mountable to the bow in a variety of fashions, such as mounting to the site; however, in other embodiments the reel may be integral to the bow and non-detachable.

The present disclosure presents a method for controlling the bail of a bowfishing reel. The method includes biasing the bail of the reel into a normally-open state in which the line on the spool of the reel can be freely fed. Upon the application of an actuating force being applied to a locking mechanism, the bail is forced into a closed position. Subsequently, upon the removal of the actuation force, the bail is biased back into the normally-open state. In embodiments in which the locking mechanism includes a lever, the lever may interface to a plunger for controlling the position of the bail. Further, a spring mechanism forces the plunger and lever into a first position (in which the bail is open) when the actuation force is not being applied to the lever and also biases the bail into the normally-open state. Upon the application of the actuation force being applied to the locking mechanism, the lever is moved into a second position, which then forces the plunger to force the bail to move into a closed position.

DETAILED DESCRIPTION OF EMBODIMENTS OF THE INVENTION

The present disclosure presents various embodiments, as well as features and aspects thereof, of a bowfishing reel that enables the bail to remain in an open or unlocked position until a lever is actuated by the user. More specifically, in one embodiment of the bowfishing reel, the bail is spring loaded to bias the bail in the open position. However, a plunger that interacts with a bail lock can be actuated by moving a lever to the lock position. The bowfishing reel can be mounted near the hand grip of the bow, thereby allowing the bowfisherman to easily actuate the lever.

In operation, the line installed on the reel is attached to an arrow, either through an aperture on the arrow or to a slide that is mounted to the arrow. With the bail being biased to an open position, the line on the reel is free to be extracted. When the arrow is launched, the line is fed from the reel with an open bail, thereby preventing backlash of the arrow. The bowfisherman can then actuate the lever to close or lock the bail to prevent further feeding of the line. The bowfisherman can then reel in the line to retrieve the arrow and/or the target.

Turning now to the figures in which like elements are represented by the same label, detailed embodiments of the bowfishing reel are presented.

Figure 1A:
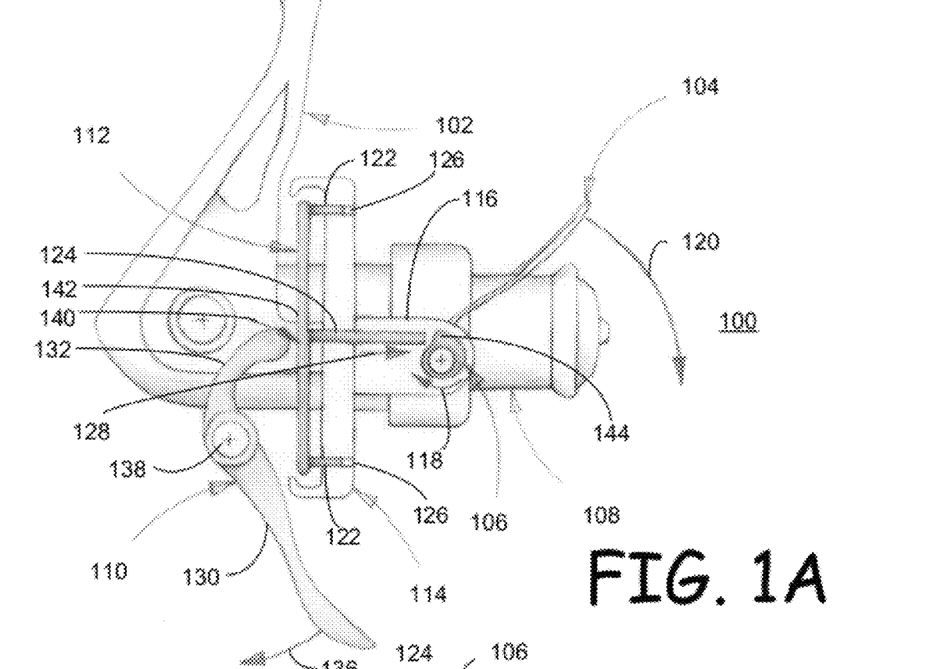
FIG. 1A is a side view of one exemplary embodiment of the bowfishing reel and FIG. 1B is a top view of the same embodiment while the bail is in the open position (collectively referred to as FIG. 1).
Figure 1B:
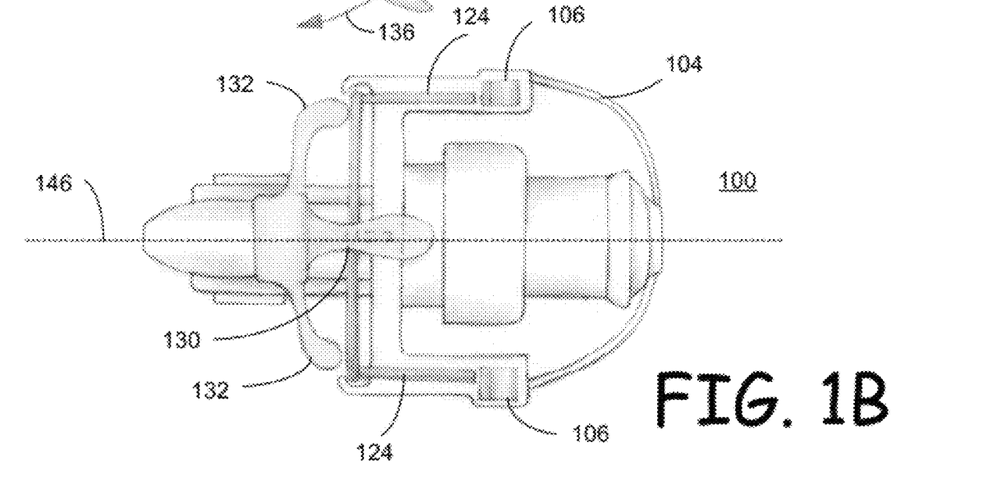

FIG. 1A is a side view of one exemplary embodiment of the bowfishing reel and FIG. 1B is a bottom view of the same embodiment while the bail is in the open position (collectively referred to as FIG. 1). The reel 100 is shown as including a reel body 102 that is attached to a mount on the bow; however, it will be appreciated that the bowfishing reel can be mounted to other surfaces or objects. For instance, as non-limiting examples, the bowfishing reel can be mounted to a harness worn by the bowfisherman, a surface in the boat such as a side rail, etc. In such varied embodiments, the mount of the bowfishing reel can take on a variety of forms including, but not limited to, screws, c-clamp style connections, clamps, etc. In the embodiments illustrated herein, the bowfishing reel is mounted to the sight holes of the bow.

The illustrated bowfishing reel includes a bail 104. As illustrated, the bail 104 is in the biased position which is open. Thus, in its steady state, the bail 104 is open and ready for an arrow to be shot. The bail is integral with, or moveably coupled to a bail actuator or bail lock 106. The bail actuator is also referred to as a bail lock because actuation of the bail actuator causes the bail to move between an open or unlocked position and a closed or locked position. When the bail actuator 106 is rotated, the bail 104 rotates or moves. Likewise, when the bail 104 is moved by hand, the bail actuator 106 rotates along with the bail 104. The illustrated bail is substantially "C" shaped to advantageously allow the line to smoothly be extracted or reeled in; however, those skilled in the art will appreciate that the bail 104 can be constructed in a variety of shapes. A few non-limiting examples include providing an open eye bend for helping to guide the line, a more squared "C" shape, etc. A spool 108 resides in the opening or the concave portion of the bail 104. The line can be wound around the spool 108.

The bowfishing reel includes a locking mechanism that includes the bail actuator 106, a lever 110, a pressure ring or plunger 112, and a plunger guide 114. The bail 104 and the bail actuator 106 are biased in the open position by a springing mechanism that is shown as being internal to the plunger guide 114; however, it will be appreciated that a variety of springing mechanisms may be used within various embodiments. The overall purpose of the springing mechanism is to ensure that the bail is biased into the open position to freely allow the line to be fed from the reel. The plunger guide 114 includes a flange 116 that is mounted to each side of the plunger guide 114 and extends toward the spool 108. The each end of the bail 104 and a bail actuator 106 is rotatably attached to one of the flanges 116. The springing mechanism forces the bail 104 and the bail actuators to move and/or be biased in the opposite direction of direction arrows 118 and 120 respectively. The springing mechanism may be any of a variety of mechanisms. A few non-limiting examples of the springing mechanism may include coil springs, tension springs, constant force springs as well as others or combinations thereof.

The plunger 112 is shown as including two guide stems 122 and two actuator rods 124. The plunger guide 114 includes apertures 124 that receive the guide stems 122 and allow the plunger to slideably move between the closed position shown in the direction of direction arrow 128 and the open position in the opposite direction of direction arrow 128. It should be appreciated that more than two guide stems 122 and apertures 124 can be utilized in various embodiments of the bowfishing reel. In addition, other mechanisms may also be employed. As a non-limiting example, the plunger 112 can be mounted to the outside of the plunger guide 114 and the guiding mechanism may be a ring that surrounds the outside of the plunger guide and allows the plunger guide so slide between the open and closed positions. Those skilled in the art will appreciate that other techniques may also be employed.

The lever 110 includes a handle portion 130 and one or more actuation fingers 132. The handle 130 is shown in FIG. 1B as extending substantially perpendicular to an axis 146 that coaxially extends through the spool 108. However, it will be appreciated that in some embodiments, the handle 130 may be angled out between the illustrated position and anywhere from its current position to 180 degrees. As an example, to provide easier access to the handle by the bowfisherman, the handle 130 may be at a 45 degree angle relative to the illustrated position. In some embodiments, multiple handles may be used to allow the bowfishing reel to be used ambidextrously. In yet other embodiments, the handle can be adjustable between multiple positions. When pressure is applied to the lever handle 130 in the direction of direction arrow 136, the lever rotates around axel 138 causing the actuation finger 132 to apply pressure in the direction of direction arrow 140 the face 142 of the plunger 112. The pressure from the actuation finger 132 forces the plunger 112 in the direction of direction arrow 128. The guide stems 122 then slide in apertures 126 and the actuator rods 124 move in tandem with plunger in the direction of direction arrow 128. The tips of the actuator rods 124 engage a flange or rib 144 of the bail actuators 106 causing them to rotate in the direction of direction arrow 118. Likewise, the bail 104 is forced into the closed position in the direction of direction arrow 120.

When the lever 110 is released, or the pressure in the direction of direction arrow 136 is removed, the springing mechanism causes the bail actuators 106 to rotate in the opposite direction from direction arrow 106, forcing the plunger 112 in the opposite direction of direction arrow 128 towards the open or unlocked position. Likewise, the bail 104 moves towards the open position in the opposite direction of direction arrow 120.

Figure 2A:
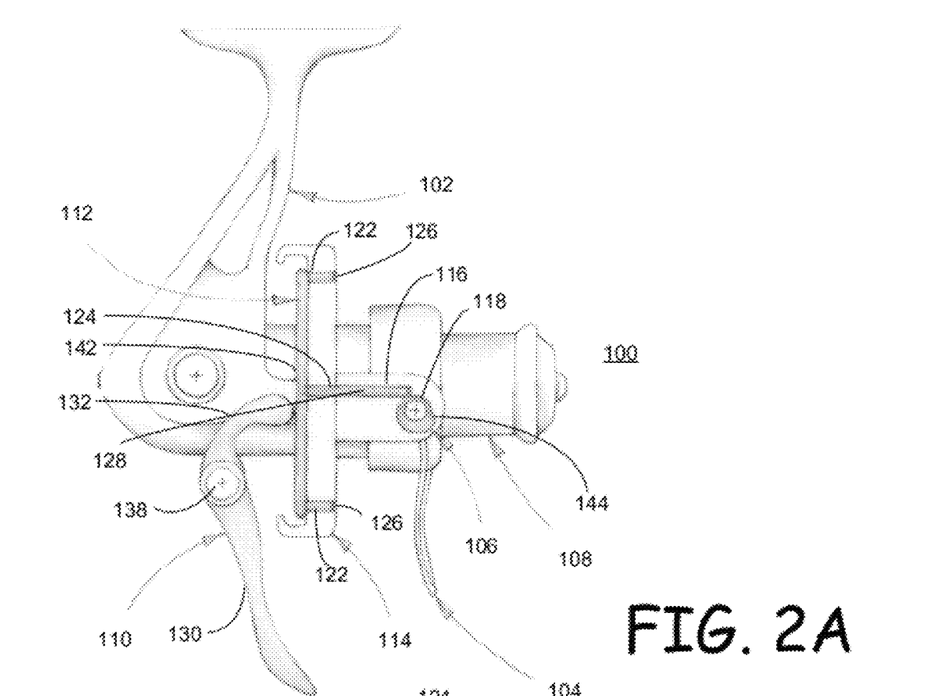
FIG. 2A is a side view and FIG. 2B is a bottom view of the exemplary embodiment of the bowfishing reel illustrated in FIG. 1 shown in the closed or locked position (collectively referred to as FIG. 2).
Figure 2B:
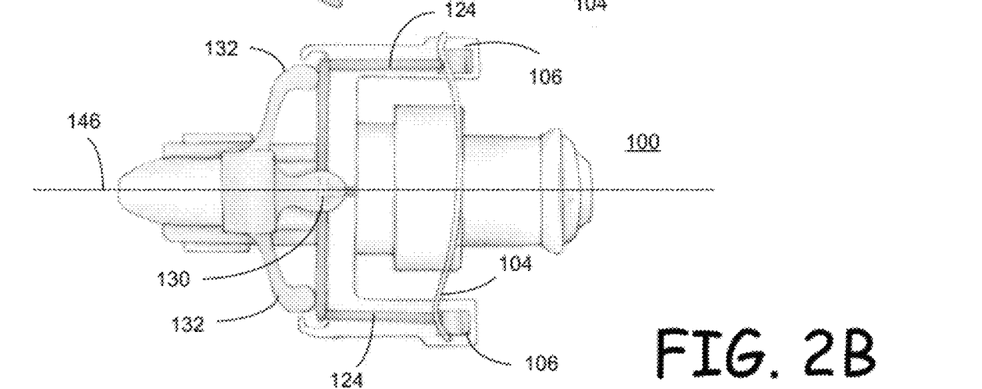

FIG. 2A is a side view and FIG. 2B is a bottom view of the exemplary embodiment of the bowfishing reel illustrated in FIG. 1 shown in the closed or locked position (collectively referred to as FIG. 2).

In another embodiment of the bowfishing reel, rather than including the plunger mechanism, the lever 110 can be mounted directly to, or be integral to the bail actuator 106. In such embodiments, when pressure is applied to the lever in the direction of direction arrow 136, the bail is forced to move to the closed position. In yet other embodiments, the lever may be mounted directly to the bail and operate in the same fashion.

Figure 3:
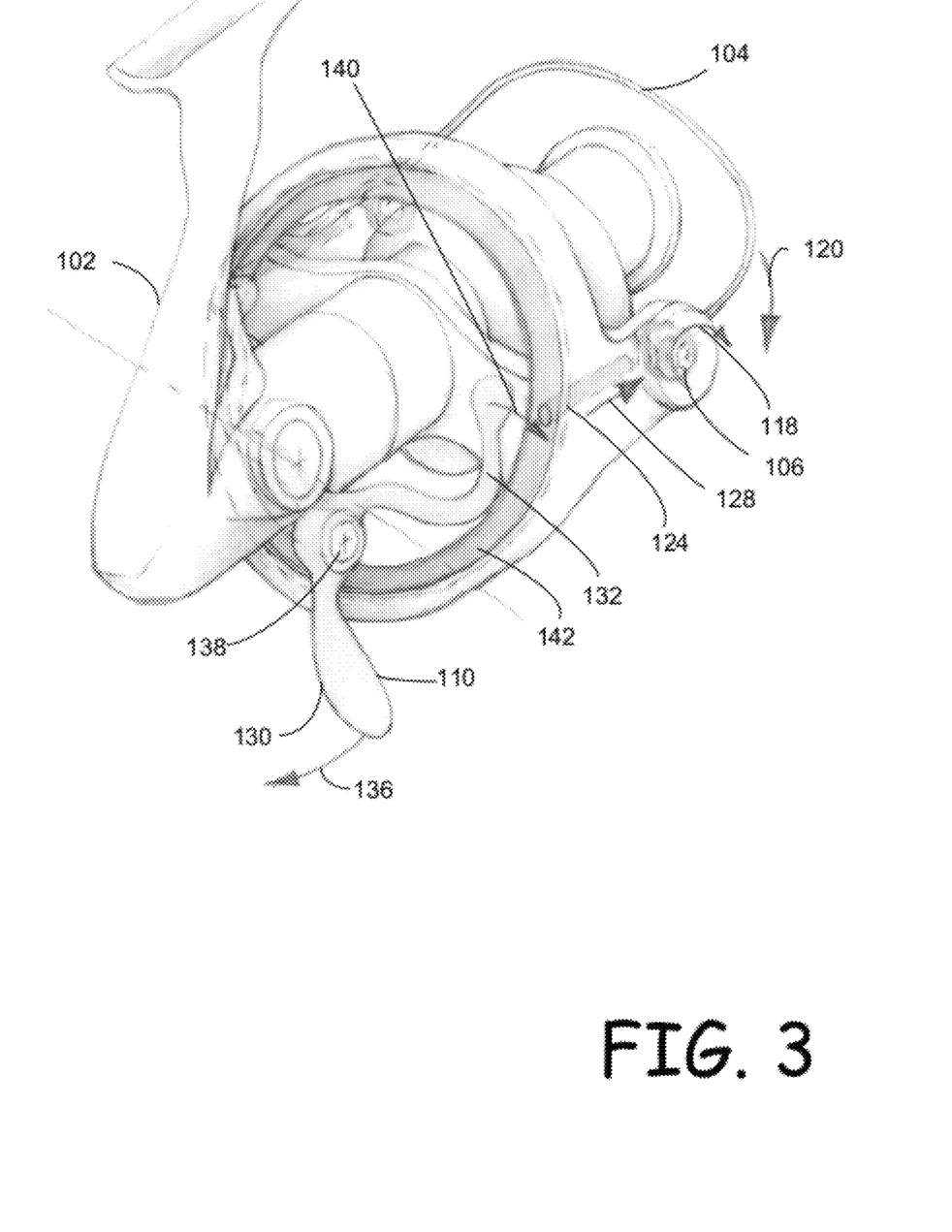
FIG. 3 is a perspective view of the bowfishing reel illustrated in FIG. 1 and FIG. 2.

FIG. 3 is a perspective view of the bowfishing reel illustrated in FIG. 1 and FIG. 2. In this view the face 142 of the plunger 112 is shown as a ring from which the actuation rods 124 extend.

Figure 4:
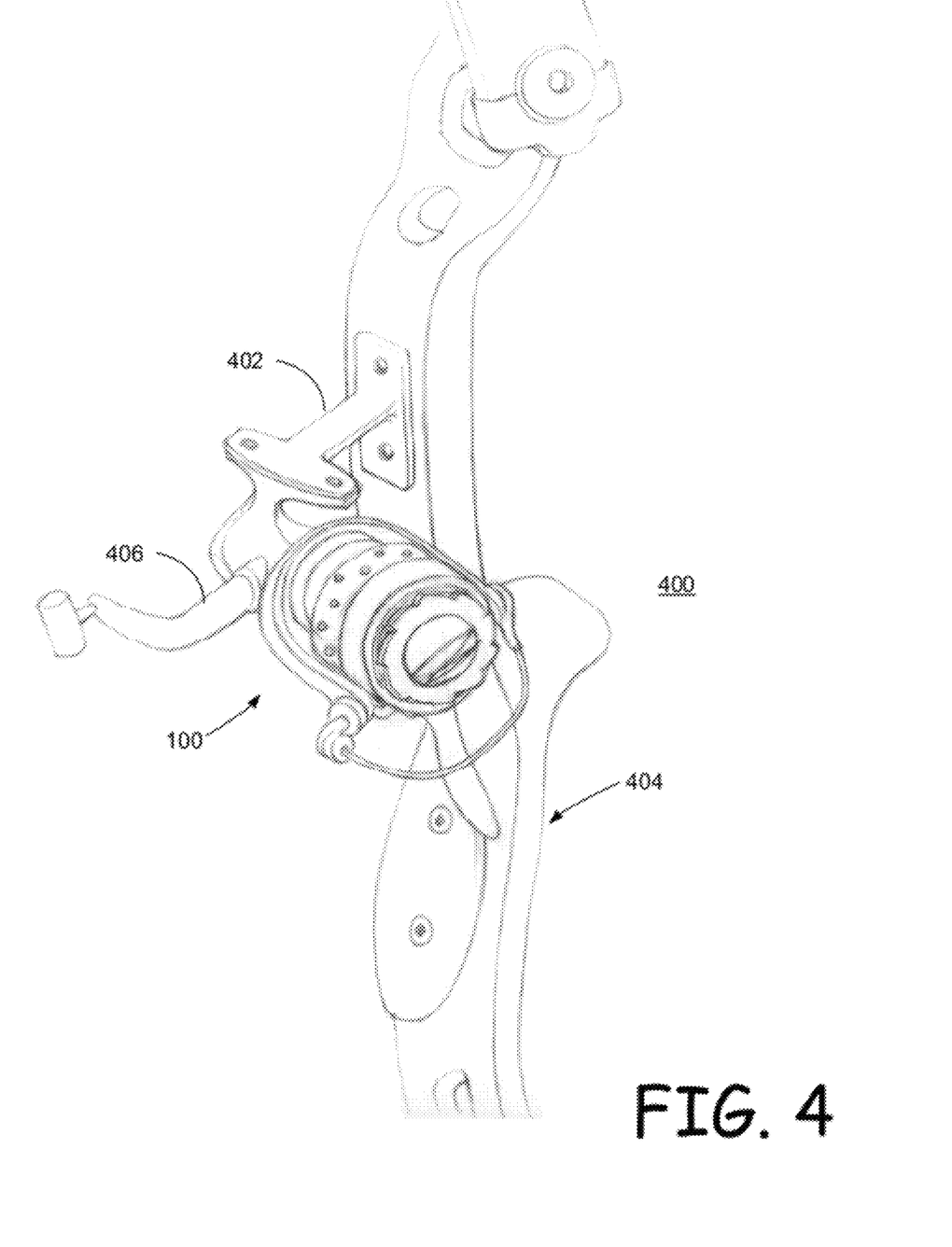
FIG. 4 is a perspective view of an embodiment of the bowfishing reel 100 being mounted to a bow 400.

FIG. 4 is a perspective view of an embodiment of the bowfishing reel 100 being mounted to a bow 400. The bow 400 includes a handle or grip 404 and a site mount 402 connected to the bow 400 above the grip 402. The bowfishing reel 100 is attached to the site bracket 402. The reel body 102 is illustrated as being mounted to the site bracket 402.

In operation, a bowfisherman attaches line that is wrapped around the spool 108 to an aperture in the arrow, a slide mounted to the arrow or some other mechanism employed for connecting the line to the arrow. While not applying any pressure to the lever 110, the bail is in the open position. The bowfisherman then pulls back on the arrow and string of the bow and takes aim. At the desired time, the bowfisherman releases the arrow. The arrow then leaves the bow and the line begins to be fed from the spool. At anytime, the bowfisherman can then apply pressure to the handle 130 in the direction of arrow 136 to cause the bail to move to the locked or closed position. This prevents the line from continuing to be fed from the spool thus stopping arrow from further flight or, if the target was struck, prevents to target from pulling the line from the spool 108. The bowfisherman can then begin to rotate the crank 406 of the reel to rewind the line and retrieve the arrow or, during a fight with the target. Similar to a standard spinning reel, while the line is being reeled in the spool does not spin. Rather, the spool oscillates up and down and the bail spins to wrap the line onto the spool. When the lever handle 130 is pulled in the direction of direction arrow 136, the actuation fingers 132 force the plunger 112 in the direction of direction arrow 128. The guide stems 122 then slide in apertures 126 and the actuator rods 124 move in tandem with plunger in the direction of direction arrow 128. The tips of the actuator rods 124 engage a flange or rib 144 of the bail actuators 106 causing them to rotate in the direction of direction arrow 118. As such, the bail 104 is forced into the closed position in the direction of direction arrow 120 and the bowfisherman can reel in the line. When the bowfisherman releases the lever, the bail opens (forced by a spring in the bail) pushing the plunger 112 and lever back to their normal positions. The bail will still spin in the open position, but it will cause line to be reeled in unless it is closed.

In another embodiment of the fishing reel, the spool rotates and the bail is stationary. In this embodiment, the spool rotates and oscillates up and down and the bail is normally open. When the bowfisherman pulls the lever handle 130, it closes the bail and the line will be guided onto the spool as it is reeled in by the bowfisherman.

In the various embodiments that have been described, in general the structures are designed such that in a steady state condition, the line can be freely fed from the reel. It will be appreciated that other variations may also be used in other embodiments. For instance, the mechanism described for forcing the bail from an open to a closed position has been presented as a lever, a guided plunger and a actuator or bail lock. Further, the bail has been described as being biased to an open position by a spring mechanism. As such, in general the various embodiments may include any mechanism that forces the bail into a steady state open position and that requires a user action to force and maintain the bail in a closed position. As one variation, an electronic mechanism may be employed to cause the bail to move from the open to the closed position. For instance, a push button that can be installed onto the bow or reel at an easily accessible location may be used to drive an electronic servo or other mechanism that drives the bail into the closed position. While the button is depressed, the bail is forced into the closed position and once released, the bail returns to the open position. In yet another embodiment, the bow may include a gravity based switching mechanism such that when the bow is rotated away from an upright position, the switching mechanism cause the bail to move into the closed position. Returning the bow to the upright or shooting position cause the bail to return to the biased open position. In yet another embodiment, any of the described mechanism may be integral to the handle or grip of the bow such that whenever the grip is being held, the bail is prevented from entering the closed position. In such an embodiment, the bowfisherman is forced to hold the bow at a different location in order to close the bail and reel in the line.

Some embodiments of the bow fishing reel may include the ability to lock the bail into the open position either permanently or on a temporary basis. For the embodiments that can only be locked temporarily, the bail can be forced into the closed position for retrieving the line, but as soon as pressure or tension is removed from the line, the bail reverts to the open position.

In yet another embodiment, the reel may include a switching mechanism that is integral to the bow and that can detect placement of an arrow into the bow or tension of the bow string. For instance, if the reel can be locked into the closed position, such a mechanism would override the lock and force the bail into the open position if an arrow is loaded and/or the bow string is drawn back.

Some embodiments of the bowfishing reel may be entirely mechanical, and some maybe a combination of electro-mechanical. As an example, the reel may include a processor that interfaces to one or more sensors and includes one or more controller outputs. The sensors may include an arrow sensor located on the bow to detect when an arrow is loaded, a tension sensor to detect when the bow is being drawn, a pressure sensor on the grip to detect when a user is holding the bow, an accelerometer to detect when the bow is in an up-right position, a sensor to detect when line is being fed from the spool, etc. The processor can detect the state of the one or more sensors and heuristically use this information to determine how to actuate the controller outputs. For instance, if the processor detects that an arrow is loaded, then the controller output can be set to prevent the bail from being moved into a locked position. This can be the case even in embodiments that include a mechanical mechanism, such as a lever, to cause the bail to move to the closed position. Thus, if a user actuates the lever while an arrow is loaded, the processor can override the mechanical mechanism and keep the bail in the open position. As another example, while line is being fed from the spool, the processor maintains the bail in the open position. Similarly, the processor can detect when an arrow is loaded, the bow is drawn and the arrow is launched. The processor can then detect when the line is no longer being fed from the spool and then automatically cause the bail to move into the closed position. Other variants of embodiments employing electro-mechanical operation are also anticipated.

Figure 5:
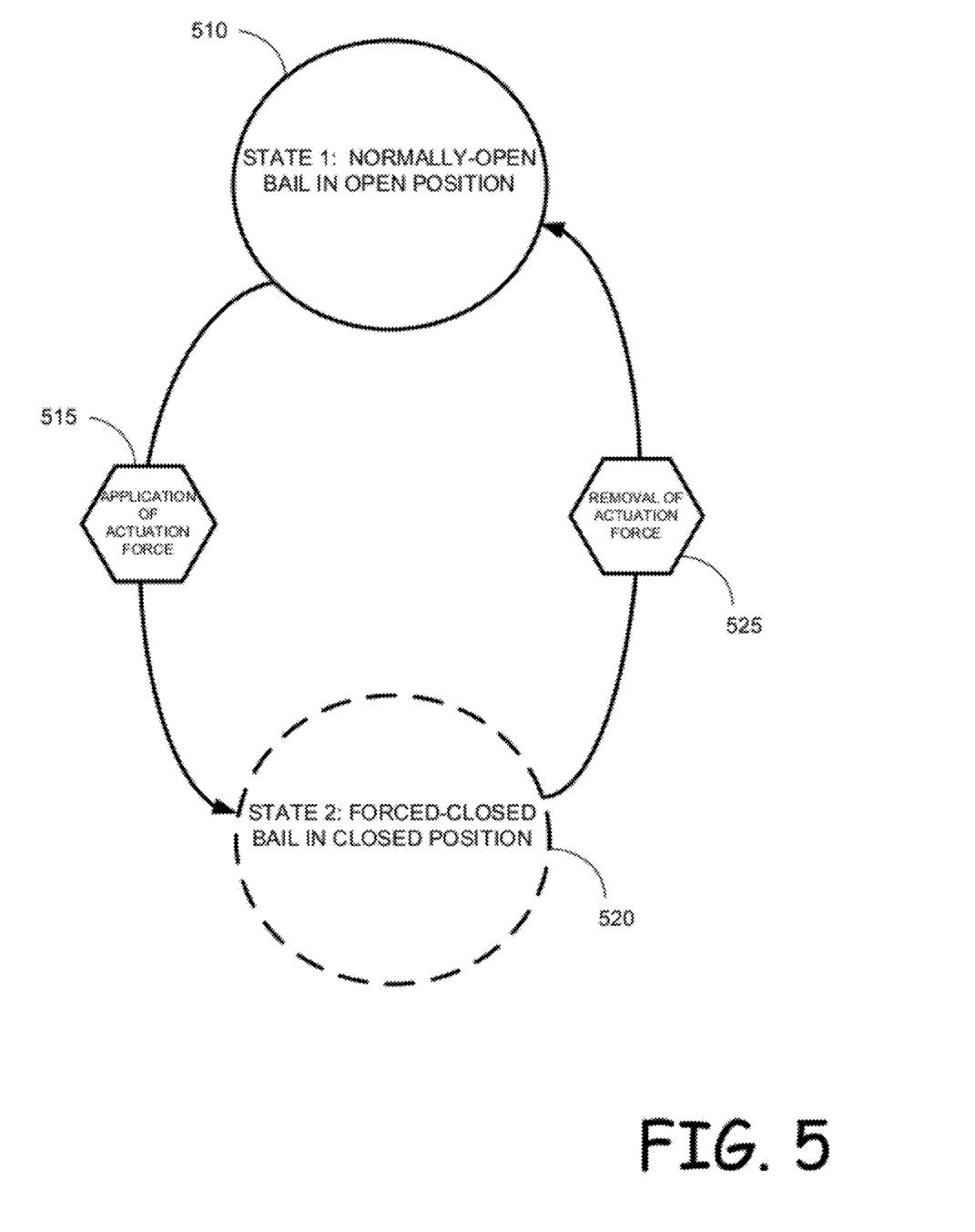
FIG. 5 is a state diagram showing the operation of an exemplary embodiment of the bowfishing reel.

FIG. 5 is a state diagram showing the operation of an exemplary embodiment of the bowfishing reel. In the illustrated state diagram, the solid circle represents a steady state or a biased state. The dashed circle represents a temporary state that is only active in the presence of an outside force. The hexagrams represent an action taken by an outside force such as a user or a processor, etc. The steady state (STATE 1) in the illustrated diagram is a NORMALLY-OPEN state 510 in which the bail is biased into the open position. Upon the application of an actuation force 515, the reel moves into a temporary state (STATE 2) which is the FORCED-CLOSED position 520. In the FORCED-CLOSED position 520 the bail is closed. Upon removal of the actuation force 525, the reel returns to the stead state (STATE 2) in the NORMALLY-OPEN state 510.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A reel for use in bowfishing comprising:
   a bail that is coupled to a spring mechanism to bias the bail into an open position;
   a lever that can be actuated in a first direction to cause the bail to move to a closed position;
   wherein when the lever is released, the spring mechanism causes the bail to return to the open position.

2. The reel of claim 1, further comprising a plunger that interfaces to the bail and the lever such that when the lever is actuated, the plunger forces the bail into the closed position.

3. The reel of claim 2, wherein the plunger includes a plunger guide and one or more actuating rods, wherein the actuating rods interface to the bail and the plunger guide allows the plunger to slide from a first position to a second position, wherein when the plunger is in the first position, the bail is open and when the plunger is in the second position, the bail is closed.

4. The reel of claim 3, further comprising a bail actuator that interfaces to the bail in such a way that when the bail actuator rotates in a first direction, the bail moves from an open position to a closed position and when the bail actuator rotates in a second direction, the bail moves from a closed position to an open position.

5. The reel of claim 4, wherein the actuating rods force the bail actuator to rotate in the first direction when the plunger slides from the first position to the second position.

6. A normally open-bail reel comprising:
- a bail that is coupled to a spring mechanism to bias the bail into an open position;
- a spool that holds a portion of fishing line and, in cooperation with the bail, receives line as it is reeled in;
- a locking mechanism comprising:
  - a bail actuator that interfaces with the bail;
  - a lever;
  - a plunger; and
  - a plunger guide;
- wherein when the lever is at rest, the bail remains in the open position and, when the lever is actuated, the lever engages the plunger which then engages the bail actuator forcing the bail into a closed position.

7. The normally open-bail reel of claim 6, further comprising a crank which when turned, forces the bail to rotate around the spool and forces the spool to oscillate such that when the bail is in the closed position, the crank can be turned to rewind fishing line onto the spool.

8. The normally open-bail reel of claim 6, further comprising a crank which when turned, forces the spool to spin and to oscillate such that when the bail is in the closed position, the crank can be turned to rewind fishing line onto the spool.

9. The normally open-bail reel of claim 6, wherein the lever includes a handle portion and one or more actuation fingers, the lever being pivotally mounted such that when the handle is pulled in a first direction, the lever rotates around a pivot causing the actuator fingers to move in an opposing direction and engage with the plunger.

10. The normally open-bail reel of claim 6, wherein the lever includes a handle portion and one or more actuation fingers, the lever being pivotally mounted such that when the spring mechanism forces the bail actuator and plunger to force the actuator fingers to move in a first direction, the lever rotates around a pivot causing the handle to move in an opposing direction.

11. A bow for use in bowfishing comprising:
- a bow;
- a site mounting on the bow; and
- a reel mounted to the site mounting, the reel comprising:
  - a bail that is coupled to a spring mechanism to bias the bail into an open position;
  - a lever that can be actuated in a first direction to cause the bail to move to a closed position;
  - wherein when the lever is released, the spring mechanism causes the bail to return to the open position.

12. The bow of claim 11, further comprising a plunger that interfaces to the bail and the lever such that when the lever is actuated, the plunger forces the bail into the closed position.

13. The bow of claim 12, wherein the plunger includes a plunger guide and one or more actuating rods, wherein the actuating rods interface to the bail and the plunger guide allows the plunger to slide from a first position to a second position, wherein when the plunger is in the first position, the bail is open and when the plunger is in the second position, the bail is closed.

14. The bow of claim 13, further comprising a bail actuator that interfaces to the bail in such a way that when the bail actuator rotates in a first direction, the bail moves from an open position to a closed position and when the bail actuator rotates in a second direction, the bail moves from a closed position to an open position.

15. The reel of claim 14, wherein the actuating rods force the bail actuator to rotate in the first direction when the plunger slides from the first position to the second position.

16. The bow of claim 15, further comprising a crank and a spool that receives fishing line, the crank interfaces with the spool and the bail such that when the crank is rotated while the bail is in a closed position, the spool oscillates back and forth as the bail spins thereby pulling in the line and winding the line onto the spool.

17. The bow of claim 15, further comprising a crank and a spool that receives fishing line, the crank interfaces with the spool and the bail such that when the crank is rotated while the bail is in a closed position, the spool oscillates back and forth and spins thereby pulling in the line through the bail and winding the line onto the spool.

18. A method for controlling the bail of a bowfishing rail, the method comprising the actions of:
- biasing the bail of the real into a normally-open state in which the line on the spool of the reel can be freely fed;
- upon application of an actuating force applied to a locking mechanism, forcing the bail into a closed position; and
- upon removal of the actuation force, bias the bail back into the normally-open state.

19. The method of claim 18, wherein the locking mechanism includes a lever that interfaces to a plunger for controlling the position of the bail and a spring mechanism that forces the plunger and lever into a first position when the actuation force is not being applied to the lever and biases the bail into the normally-open state, and wherein the application of the actuation force applied to the locking mechanism further comprises forcing the lever into a second position, which then forces the plunger to cause the bail to move into a closed position.

20. A reel for use in bowfishing comprising:
- a locking mechanism that is coupled to a spring mechanism to bias the locking mechanism into an open position thereby allowing string to freely exit the reel;
- a lever that can be actuated in a first direction to cause the locking mechanism to move to a closed position;
- wherein when the lever is released, the spring mechanism causes the locking mechanism to return to the open position.

21. The reel of claim 20, further comprising a plunger that interfaces to the lever such that when the lever is actuated, the plunger forces the locking mechanism into the closed position.

22. The reel of claim 21, wherein the plunger includes a plunger guide and one or more actuating rods, wherein the actuating rods interface to the locking mechanism and the plunger guide allows the plunger to slide from a first position to a second position, wherein when the plunger is in the first position, the locking mechanism is open and when the plunger is in the second position, the locking mechanism is closed.

23. The reel of claim 22, further comprising a bail actuator that interfaces to the bail in such a way that when the locking mechanism actuator rotates in a first direction, the locking mechanism moves from an open position to a closed position and when the locking mechanism actuator rotates in a second direction, the locking mechanism moves from a closed position to an open position.

24. The reel of claim 23, wherein the actuating rods force the locking mechanism actuator to rotate in the first direction when the plunger slides from the first position to the second position.

25. A method for controlling the string feed from a bowfishing reel, the method comprising the actions of:
- biasing the reel into a normally-open state in which the line on the spool of the reel can be freely fed;
- upon application of an actuating force applied to a locking mechanism, forcing the reel into a closed state; and upon removal of the actuation force, biasing the reel back into the normally-open state.

26. The method of claim 25, wherein the locking mechanism includes a lever that interfaces to a plunger for controlling the state of the reel and a spring mechanism that forces the plunger and lever into a first position when the actuation force is not being applied to the lever and biases the reel into the normally-open state, and wherein the application of the actuation force applied to the locking mechanism further comprises forcing the lever into a second position, which then forces the plunger to cause the reel to move into a closed state.

* * * * *